US012475607B2

(12) United States Patent
Liew et al.

(10) Patent No.: US 12,475,607 B2
(45) Date of Patent: Nov. 18, 2025

(54) GENERATING OBJECTS OF MIXED CONCEPTS USING TEXT-TO-IMAGE DIFFUSION MODELS

(71) Applicant: Lemon Inc., Grand Cayman (KY)

(72) Inventors: Jun Hao Liew, Singapore (SG); Hanshu Yan, Singapore (SG); Daquan Zhou, Los Angeles, CA (US); Jiashi Feng, Singapore (SG)

(73) Assignee: Lemon Inc., Grand Cayman (KY)

( * ) Notice: Subject to any disclaimer, the term of this patent is extended or adjusted under 35 U.S.C. 154(b) by 470 days.

(21) Appl. No.: 18/050,349

(22) Filed: Oct. 27, 2022

(65) Prior Publication Data

US 2024/0144544 A1     May 2, 2024

(51) Int. Cl.
| | | |
|---|---|---|
| *G06T 11/00* | (2006.01) | |
| *G06F 40/40* | (2020.01) | |
| *G06T 5/20* | (2006.01) | |
| *G06T 5/70* | (2024.01) | |

(52) U.S. Cl.
CPC .............. *G06T 11/00* (2013.01); *G06F 40/40* (2020.01); *G06T 5/20* (2013.01); *G06T 5/70* (2024.01); *G06T 2207/20084* (2013.01)

(58) Field of Classification Search
CPC ... G06T 11/00; G06T 5/20; G06T 5/70; G06T 2207/20084; G06T 11/60; G06F 40/40; G06F 40/30; G06F 40/284; G06N 3/04; G06N 3/08
See application file for complete search history.

(56) References Cited

U.S. PATENT DOCUMENTS

| | | | | |
|---|---|---|---|---|
| 11,908,180 | B1* | 2/2024 | Ho | G06V 10/82 |
| 12,248,884 | B2* | 3/2025 | Xiong | G06N 5/02 |
| 2014/0223271 | A1* | 8/2014 | Racklyeft | G06T 13/80 |
| | | | | 715/201 |
| 2021/0358086 | A1* | 11/2021 | Jørgensen | G06T 5/73 |
| 2022/0398450 | A1* | 12/2022 | Jin | G06N 3/086 |
| 2023/0290135 | A1* | 9/2023 | Zhou | G06V 10/82 |
| 2023/0377226 | A1* | 11/2023 | Saharia | G06V 10/82 |
| 2024/0153247 | A1* | 5/2024 | Zhang | G06V 10/40 |
| 2024/0169479 | A1* | 5/2024 | Wang | G06T 3/4053 |
| 2024/0193412 | A1* | 6/2024 | Bai | G06N 3/08 |

OTHER PUBLICATIONS

Valevski, Dani, et al. "Unitune: Text-driven image editing by fine tuning an image generation model on a single image." arXiv preprint arXiv:2210.09477 2.3 (2022): 5. (Year: 2022).*

Buades, Antoni, Bartomeu Coll, and Jean-Michel Morel. "Image denoising methods. A new nonlocal principle." SIAM review 52.1 (2010): 113-147. (Year: 2010).*

(Continued)

*Primary Examiner* — Andrae S Allison
(74) *Attorney, Agent, or Firm* — Fish & Richardson P.C.

(57) ABSTRACT

Generating an object using a diffusion model includes obtaining a first input and a second input, and synthesizing an output object from the first input and the second input. The synthesizing of the output object includes generating a layout of the output object from the first input, injecting the second input as a content conditioner to the layout of the output object, and de-noising the layout of the output object injected with the content conditioner to generate a content of the output object.

17 Claims, 12 Drawing Sheets

(56) References Cited

OTHER PUBLICATIONS

Poole, Ben, et al. "Dreamfusion: Text-to-3d using 2d diffusion." arXiv preprint arXiv:2209.14988 (2022). (Year: 2022).*

Weinbach, Samuel, et al. "M-vader: A model for diffusion with multimodal context." arXiv preprint arXiv:2212.02936 (2022). (Year: 2022).*

Liew, Jun Hao, et al. "Magicmix: Semantic mixing with diffusion models." arXiv preprint arXiv:2210.16056 (2022). (Year: 2022).*

Gal et al., "An Image isWorth One Word: Personalizing Text-to-Image Generation using Textual Inversion", Computer Science, Computer Vision and Pattern Recognition, Submitted on Aug. 2, 2022, https://arxiv.org/abs/2208.01618.

Gatys et al., "A Neural Algorithm of Artistic Style", Computer Science, Computer Vision and Pattern Recognition, last revised Sep. 2, 2015, https://arxiv.org/abs/1508.06576.

Goodfellow et al., "Generative Adversarial Networks", Nov. 2020, vol. 63, No. 11, pp. 139-144, Communications of the ACM, https://dl.acm.org/doi/10.1145/3422622.

Hertz et al., "Prompt-to-Prompt Image Editing with Cross Attention Control", Computer Science, Computer Vision and Pattern Recognition, submitted on Aug. 2, 2022, https://arxiv.org/abs/2208.01626.

Ho et al., "Denoising Diffusion Probabilistic Models", Computer Science, Machine Learning, last revised Dec. 16, 2020, https://arxiv.org/abs/2006.11239.

Karras et al., "A Style-Based Generator Architecture for Generative Adversarial Networks", Computer Science, Neural and Evolutionary Computing, last revised Mar. 29, 2019, https://arxiv.org/abs/1812.04948.

Kingma et al., "Auto-Encoding Variational Bayes", Statistics, Machine Learning, revised May 1, 2014, https://arxiv.org/abs/1312.6114v10.

Liu et at., "Compositional Visual Generation with Composable Diffusion Models", Computer Science, Computer Vision and Pattern Recognition, Jun. 3, 2022, https://arxiv.org/abs/2206.01714v1.

Luan et al., "Deep Photo Style Transfer", Computer Science, Computer Vision and Pattern Recognition, last revised Apr. 11, 2017, https://arxiv.org/abs/1703.07511.

Lugmayr et al., "RePaint: Inpainting using Denoising Diffusion Probabilistic Models", Computer Vision Foundation, 2021, pp. 11461-11471, https://openaccess.thecvf.com/content/CVPR2022/papers/Lugmayr_RePaint_Inpainting_Using_Denoising_Diffusion_Probabilistic_Models_CVPR_2022_paper.pdf.

Rombach et al., "High-Resolution Image Synthesis with Latent Diffusion Models", Computer Science, Computer Vision and Pattern Recognition, last revised Apr. 13, 2022, https://arxiv.org/abs/2112.10752.

Song et al., "Score-Based Generative Modeling through Stochastic Differential Equations", Computer Science, Machine Learning, last revised Feb. 10, 2021, https://arxiv.org/abs/2011.13456.

Ulyanov et al., "Texture Networks: Feed-forward Synthesis of Textures and Stylized Images", Computer Science, Computer Vision and Pattern Recognition, Submitted Mar. 10, 2016, https://arxiv.org/abs/1603.03417.

Zhu et al., "Unpaired Image-to-Image Translation using Cycle-Consistent Adversarial Networks", Computer Science, Computer Vision and Pattern Recognition, last revised Aug. 24, 2020, https://arxiv.org/abs/1703.10593.

Stenbit et al., "A walk through latent space with Stable Diffusion", Keras, Code examples/Generative Deep Learning, Last modified Sep. 28, 2022, https://keras.io/examples/generative/random_walks_with_stable_diffusion/.

* cited by examiner

GENERATING OBJECTS OF MIXED CONCEPTS USING TEXT-TO-IMAGE DIFFUSION MODELS

FIELD

The embodiments described herein pertain generally to generating an object using a diffusion model. More specifically, the embodiments described herein pertain to generating an object from text and/or image input using a pre-trained text-to-image diffusion-based generative model.

BACKGROUND

A text-to-image model is a machine learning model that may be used to receive a natural language description (e.g., text) as an input and generate an image that matches the description. Some text-to-image models may be used to generate collages of images by arranging existing component images from e.g., a database of clip art. Some text-to-image models may be able to generate more complex images such as compositions based on the input text (e.g., "an astronaut riding a horse"). Some techniques, such as style transfer, can combine two images (a first image and a second image) together so that the resultant output image retains core elements of the first image but appears to be painted in the style of the second image. Other techniques, such as prompt interpolation, includes interpolating two different text prompts in a text latent space (i.e., a representation of compressed data in which similar data points are closer together in space) before being used for image generation. When using prompt interpolation, in cases where the two concepts are extremely dissimilar (e.g., a living object and a non-living object), the generated image is typically dominated by one of the concepts.

SUMMARY

In one example embodiment, a method for generating an object using a diffusion model includes obtaining a first input and a second input, and synthesizing an output object from the first input and the second input. The synthesizing of the output object includes generating a layout of the output object from the first input, injecting the second input as a content conditioner to the layout of the output object, and de-noising the layout of the output object injected with the content conditioner to generate a content of the output object.

Embodiments described herein may provide examples of synthesizing an object of mixed concepts (e.g., synthesizing a raccoon-alike coffee machine from concepts "raccoon" and "coffee machine"; synthesizing a new species from concepts "rabbit" and "tiger"; etc.) while the synthesized object being photo-realistic. Embodiments described herein may also provide examples of blending two semantics that are highly dissimilar. It is to be understood that rendering such imaginary scenes or objects (e.g., the raccoon-alike coffee machine, the new species synthesized from "rabbit" and "tiger", etc.) may be challenging due to the non-existence of such objects in the real world.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
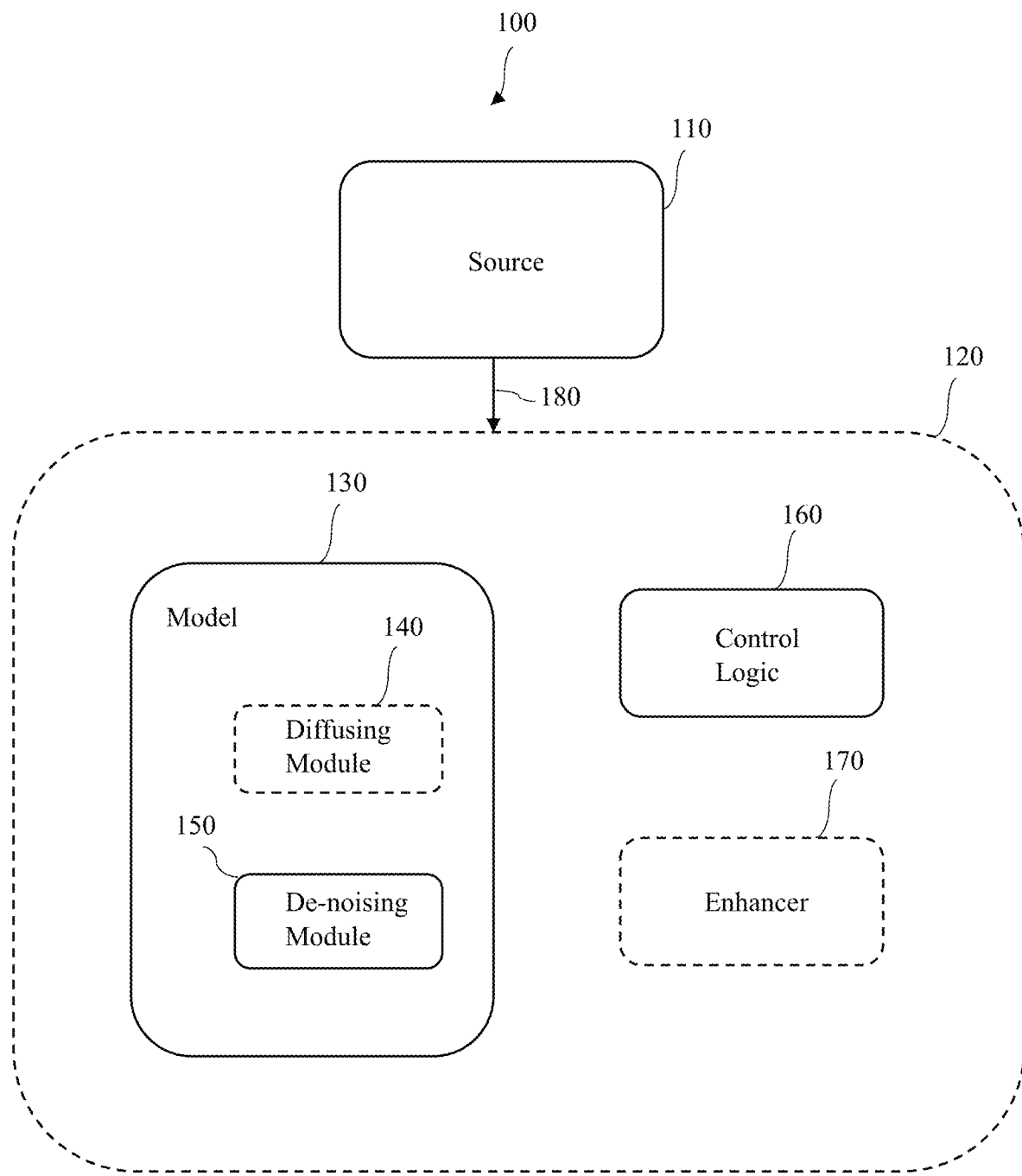
FIG. 1 illustrates an example system in which generating an object of mixed concepts using a diffusion model may be implemented, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "text-to-image model" or "text-to-image generative model" may refer to a machine learning model that may be used to receive a natural language description (e.g., text) as an input and produce an image that matches the natural language description. It is to be understood that a text-to-image model typically includes a language model (which may be used to transform the received text input into a latent representation) and a generative image model (which may be used to produce an image conditioned on that latent representation). It is also to be understood that in the field of artificial intelligence and/or machine learning, training a text-to-image model typically requires a dataset of images that are paired with one or more text captions. It is further to be understood that "pre-trained" may indicate that a machine learning model has been trained and the corresponding training checkpoint has been used. A "pre-trained" text-to-image model may refer to a text-to-image model that has been trained on sufficient image and text data e.g., scraped from the web, a database, the cloud, etc.

As referenced herein, "diffusion model" or "diffusion-based model" in machine learning may refer to a diffusion probabilistic model and/or a latent variable model. It is to be understood that diffusion models are designed to learn the latent structure of a dataset by modeling the way in which data points diffuse through the latent space. For example, in computer vision, diffusion models include a neural network that is trained to de-noise images blurred with Gaussian noise to reverse the diffusion process. It is also to be understood that diffusion models may be applied to a variety of tasks, including image de-noising, in-painting, super-resolution, image generation, etc. For example, utilization of an image generation diffusion model may start with a random noise image and then, after having been trained to reverse the diffusion process performed on natural images, the diffusion model may be implemented to generate new natural images. It is further to be understood that given an image ("$x_0$") randomly sampled from a real data distribution, there can be two processes in a diffusion model: (1) a forward process (or referred to as a diffusing process, a diffusion process, etc.) that repeatedly adds Gaussian noise to the sample to generate a diffused sample so that the sample gradually becomes Gaussian noise after a certain amount (e.g., the number T) of operations or iterations ($x_0 \rightarrow x_T$), and (2) a reverse process (or referred to as a de-noising process, etc.) that repeatedly de-noises given a Gaussian noise input (e.g., the diffused sample, etc.) to generate a de-noised output ($x_T \rightarrow x_0$).

It is to be understood that a diffusion process may be a continuous-time Markov process with continuous sample paths. The diffusion process may corrupt a sample (e.g., an image, etc.) by adding Gaussian noise to the sample. As referenced herein, "Gaussian noise" may denote a type of signal noise that has a probability density function equal to that of the normal distribution (also known as the Gaussian distribution). It is also to be understood that a de-noising process (or noise reduction process) may be a process of removing noise from a sample. It is further to be understood that in some example embodiments, the de-noising process may distort the sample to a certain degree.

It is to be understood that "pre-trained text-to-image diffusion-based generative model" may refer to a pre-trained (described above), diffusion-based (having a diffusing process and a de-noising process from a diffusion model, described above), text-to-image generative model (described above). In an example embodiment, a text-to-image diffusion-based generative models may refer to a diffusion-based generative model that accepts a text input and synthesizes an image matching the text input. It will be appreciated that a machine learning model, such as a text-to-image diffusion-based generative model, may transform an input text into a latent representation to produce an image conditioned on that latent representation.

As referenced herein, "conditioning input" or "conditioning" or "conditioner" may refer to the input on which an operation of a process of the machine learning model is conditioned (e.g., to generate an output consistent with the conditioner). In the embodiments described and recited herein, "conditioning input," "conditioning," and "conditioner" may be used interchangeably without deviating from the intended meaning and/or scope.

It is to be understood that a text prompt may be a conditioner for a text-to-image model to generate an image that is semantically consistent with the text prompt e.g., by optimizing the latent vector or the generator to maximize the similarity between the text prompt and the image. That is, the text-to-image model may generate an image conditioned on or consistent with the conditioner (e.g., a text prompt).

It is to be understood that an object (e.g., an image, etc.) may include metadata (such as keywords, tags, or descriptions associated with the object) and non-metadata such as features of the object (e.g., color, shape, texture, element or component or part, position of the element, or any other information that may be derived from the object itself) rather than the metadata. As referenced herein, the "layout" of an object may refer to the shape, the color, the texture, and/or the position of the element(s) of the object within the object. As referenced herein, the "content" of an object may refer to non-metadata information (e.g., the element, the component, the part, and/or the category of the object, etc.) of the object other than the layout.

As referenced herein, "content conditioner" may refer to a content input (e.g., content of an object corresponding to a text input, etc.) on which an operation of a process of a machine learning model is conditioned (e.g., to generate a content of an output consistent with the content conditioner). For example, in a pre-trained text-to-image diffusion-based generative model, a content conditioner may be injected or applied or added e.g., by performing a de-noising process to generate the content of an image conditioned on or consistent with the content conditioner. It is to be understood that a text prompt may be a content conditioner for a text-to-image diffusion-based generative model to generate a content of an image consistent with the text prompt e.g., by optimizing the latent vector or the generator to maximize the similarity between the text prompt and the content of the image. That is, the text-to-image diffusion-based generative model may generate a content of an image conditioned on or consistent with the content conditioner (e.g., a text prompt).

As referenced herein, "similarity" may refer to a numeric value representing a degree of how close two objects (e.g., two images, two concepts corresponding to respective objects, etc.) are when the two objects are compared. It is to be understood that a similarity between two objects may be determined by using e.g., technologies such as sum of squared differences, mutual information, normalized mutual information, cross-correlation, etc. In an example embodiment, the higher the similarity (or value), the more contextually similar the two objects are. In such embodiment, a similarity (or value) "0" may indicate that the two objects are completely different. It is to be understood that in another example embodiment, the lower the similarity (or value), the more contextually similar the two objects are. In such embodiment, a similarity (or value) "0" may indicate that the two objects are identical.

FIG. 1 illustrates an example system 100 in which generating an object of mixed concepts using a diffusion model may be implemented, arranged in accordance with at least some embodiments described herein.

The system 100 may include a source 110 and a generator 120. In an example embodiment, the source 110 may be an electronic device (e.g., 700 of FIG. 7, etc.) including but not limited to a camera, an audio and/or video recorder, a smartphone, a tablet computer, a laptop computer, a desk computer, and/or any other suitable electronic device. In another example embodiment, the source 110 may be a storage, a database, a file, or the like. The source 110 may provide input 180 to the generator 120. In an example embodiment, the generator 120 may be an electronic device (e.g., 700 of FIG. 7, etc.) including but not limited to a camera, an audio and/or video recorder, a smartphone, a tablet computer, a laptop computer, a desk computer, and/or any other suitable electronic device. In another example embodiment, the generator 120 may be a function, an operation, an action, an algorithm, an application, or the like. In an example embodiment, the input 180 may include a text, an image, an audio, a video, etc. that is captured, generated, obtained, user-entered, etc. via the source 110. In another example embodiment, the input 180 may include a text, an image, an audio, a video, etc. that is stored in the source 110.

Figure 2:
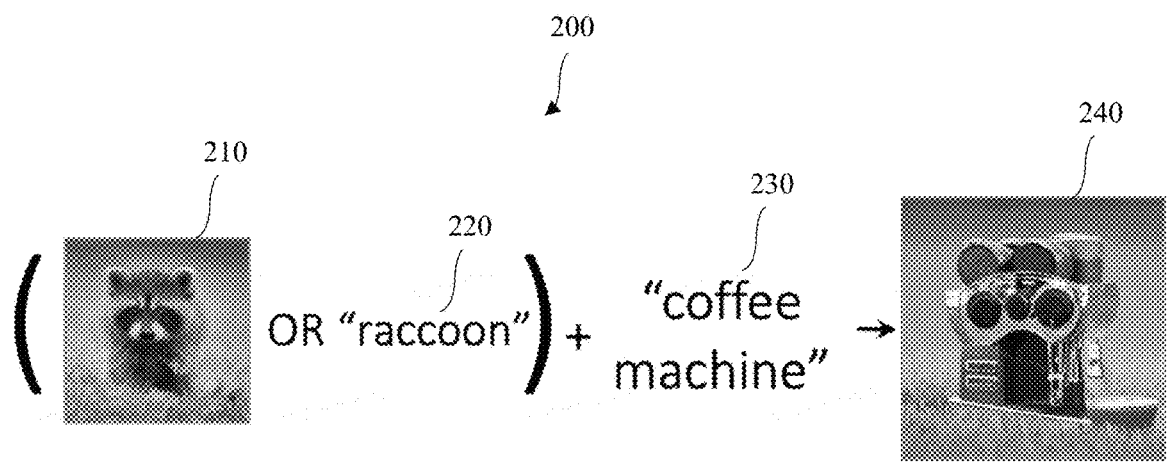
FIG. 2 illustrates an example input and output of the generator of the system of FIG. 1, arranged in accordance with at least some embodiments described herein.

The generator 120 may receive input 180 from the source 110, and generate an object based on the received input 180 (see e.g., description of FIG. 2). In an example embodiment, the generator 120 includes a model 130, a control logic 160, and an optional enhancer 170. The generator 120 may be hosted, implemented, executed, and/or stored in a device (e.g., 700 of FIG. 7, etc.). It is to be understood that although the system 100 is illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

In an example embodiment, the control logic 160 may include a plurality of operations or functions (see e.g., descriptions of FIGS. 4A and 4B) to generate an object based on the received input 180 using the model 130. The control logic 160 may also be configured to enhance or improve the quality of the resultant object using the enhancer 170 (see e.g., descriptions of FIGS. 4B and 5A-5C). The model 130 may be a machine learning model, such as a pre-trained text-to-image diffusion-based generative model. The model 130 includes a de-noising module 150 and an optional diffusing module 140.

In an example embodiment, the diffusing module 140 may include a plurality of diffusion operations or functions (see e.g., descriptions of FIGS. 3, 4A, and 4B) that, when implemented or executed, repeatedly add noise (e.g., Gaussian noise, etc.) to an input object (e.g., the input 180, etc.) to generate a diffused object so that the object gradually becomes a Gaussian noise after a certain number of operations or iterations. The de-noising module 150 may include a plurality of de-noising operations or functions (see e.g., descriptions of FIGS. 3, 4A, and 4B) to repeatedly de-noise given a Gaussian noise input (e.g., the diffused object) to generate a de-noised output.

FIG. 2 illustrates an example input and output 200 of the generator 120 of the system 100 of FIG. 1, arranged in accordance with at least some embodiments described herein.

As shown in FIG. 2, the input of the generator 120 of FIG. 1 may include a first input (210 or 220) and a second input 230 e.g., received from the source 110 of FIG. 1. The output of the generator 120 of FIG. 1 may include the output 240. In an example embodiment, the first input (210 or 220) may be an image 210. In another example embodiment, the first input (210 or 220) may be a text 220. In an example embodiment, the second input 230 may be a text, which may be the same as or different from the text input 220. In another example embodiment, the second input 230 may be an image, which may be the same as or different from the image input 210. In an example embodiment, the output 240 may be an image synthesized from the first input (210 or 220) and the second input 230. The output 240 may be stored in a storage, displayed via a displayer, or otherwise be utilized.

The first input (210 or 220) may serve as an input for a layout generation process (see descriptions of FIGS. 4A and 4B) to generate a layout of the output 240. The second input 230 may serve as a content conditioner for a content generation process (see descriptions of FIGS. 4A and 4B) to generate a content of the output 240. It is to be understood that the synthesized output 240 includes the layout and content of the output 240.

In an example embodiment, the first input 210 is an image of a raccoon, and the second input 230 is a text "coffee machine" (e.g., a text prompt, etc.). The output 240 is an image of a raccoon-like coffee machine that is synthesized from the image of the raccoon and the text "coffee machine" using a pre-trained text-to-image diffusion-based generative model. In another example embodiment, the first input 210 is a text "raccoon" (e.g., a text prompt, etc.), and the second input 230 is a text "coffee machine" (e.g., a text prompt, etc.). The output 240 is an image of a raccoon-alike coffee machine synthesized from the text "raccoon" and the text "coffee machine" using a pre-trained text-to-image diffusion-based generative model. The output 240 has the layout (e.g., color, shape, position, texture, etc.) of elements of the raccoon, and the content (the coffee machine) of the output 240 may look like the raccoon. For example, the layout of the raccoon may include the layout of the elements such as the ears, the eyes, the mouth, the nose, the body, the limbs, and/or any other elements of the raccoon. The content (the raccoon-alike coffee machine) of the output 240 may be a coffee machine with elements of the coffee machine having the layout (e.g., color, shape, position, texture, etc.) of the corresponding elements of the raccoon such that the coffee machine may look like the raccoon.

Figure 3:
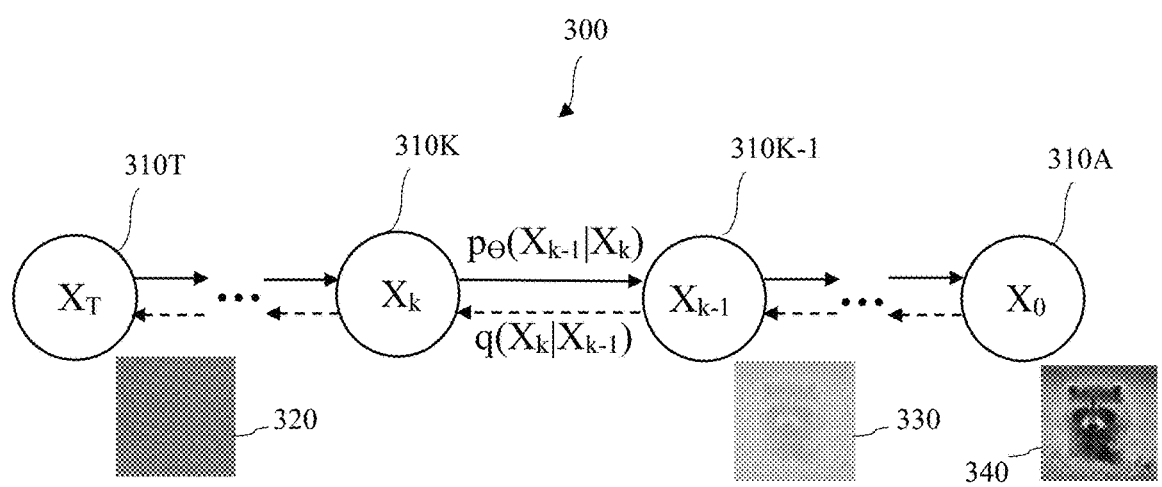
FIG. 3 illustrates an example process of generating an object using the model of the system of FIG. 1, arranged in accordance with at least some embodiments described herein.

FIG. 3 illustrates an example process 300 of generating an object using the model 130 of the system 100 of FIG. 1, arranged in accordance with at least some embodiments described herein. As discussed in FIG. 1, the model 130 may be a pre-trained text-to-image diffusion-based generative model including a de-noising module and an optional diffusing module.

In an example embodiment, the diffusing module executes a forward process (also referred to as a diffusing process, a diffusion process, etc.). See the dotted-line arrows in FIG. 3. The diffusion process starts with a process node "$x_0$". The process nodes are labeled as 310A-310T. In an example embodiment, the process node 310A $x_0$ receives the image 340 as an input. The image 340 may be an image obtained or randomly sampled from a real data distribution, or an image input received from the source 110 of FIG. 1, etc. In an example embodiment, the diffusion process may include a certain (e.g., the number T) number of operations or iterations from the process node $x_0$ to the process node 310T $x_T$ ($x_0 \rightarrow x_T$). In some example embodiments, the number T may be one, at least two, 50, 1000, or any other number. From $x_0$, the diffusion process may add noise such as Gaussian noise to the image 340 (e.g., to corrupt the image 340) to generate a diffused or corrupted image (e.g., at $x_1$). The diffusion process may repeatedly add noise to the diffused image generated at a previous process node and at $x_{k-1}$, the diffused image becomes image 330. The diffusion process may continue to repeatedly add noise to the diffused image generated at a previous process node and at $x_T$, the diffused image becomes 320 (a Gaussian noise image). That is, the diffusion process may repeatedly add noise to the image 340 to generate a diffused image whereby the image gradually becomes a Gaussian noise after T operations or iterations ($x_0 \rightarrow x_T$). As shown in FIG. 3, the diffusion process from the process node $x_{k-1}$ to the process node $x_k$ is represented as $q(x_k|x_{k-1})$.

In an example embodiment, the de-noising module may execute a reverse process (or referred to as a de-noising process, etc.). See the solid-line arrows in FIG. 3. The de-noising process starts with a process node 310T "$x_T$". In an example embodiment, the process node 310T $x_T$ receives the image 320 as an input. In an example embodiment, the de-noising process may include "T" number of operations or iterations from the process node 310T $x_T$ to the process node 310A $x_0$ ($x_T \rightarrow x_0$). The image 320 may be a random noise image (e.g., a Gaussian noise image). From 310T $x_T$, the de-noising process may de-noise (e.g., remove or filter noise such as Gaussian noise from) the image to generate a de-noised natural image (e.g., at $x_0$). The de-noising process may de-noise the image from a previous process node and at $x_{k-1}$, the de-noised image becomes image 330. The de-noising process may continue to repeatedly de-noise the image from a previous process node and at $x_0$, the de-noised image becomes 340 (a de-noised natural image without Gaussian noise). That is, the de-noising process may repeatedly de-noise the random noise image 320 to generate a de-noised image 340 after T operations or iterations ($x_T \rightarrow x_0$). As shown in FIG. 3, the de-noising process (e.g., the prediction of $x_{k-1}$ based on $x_k$) from the process node $x_k$ to the process node $x_{k-1}$ is represented as $p_\theta(x_{k-1}|x_k)$.

Figure 4A:
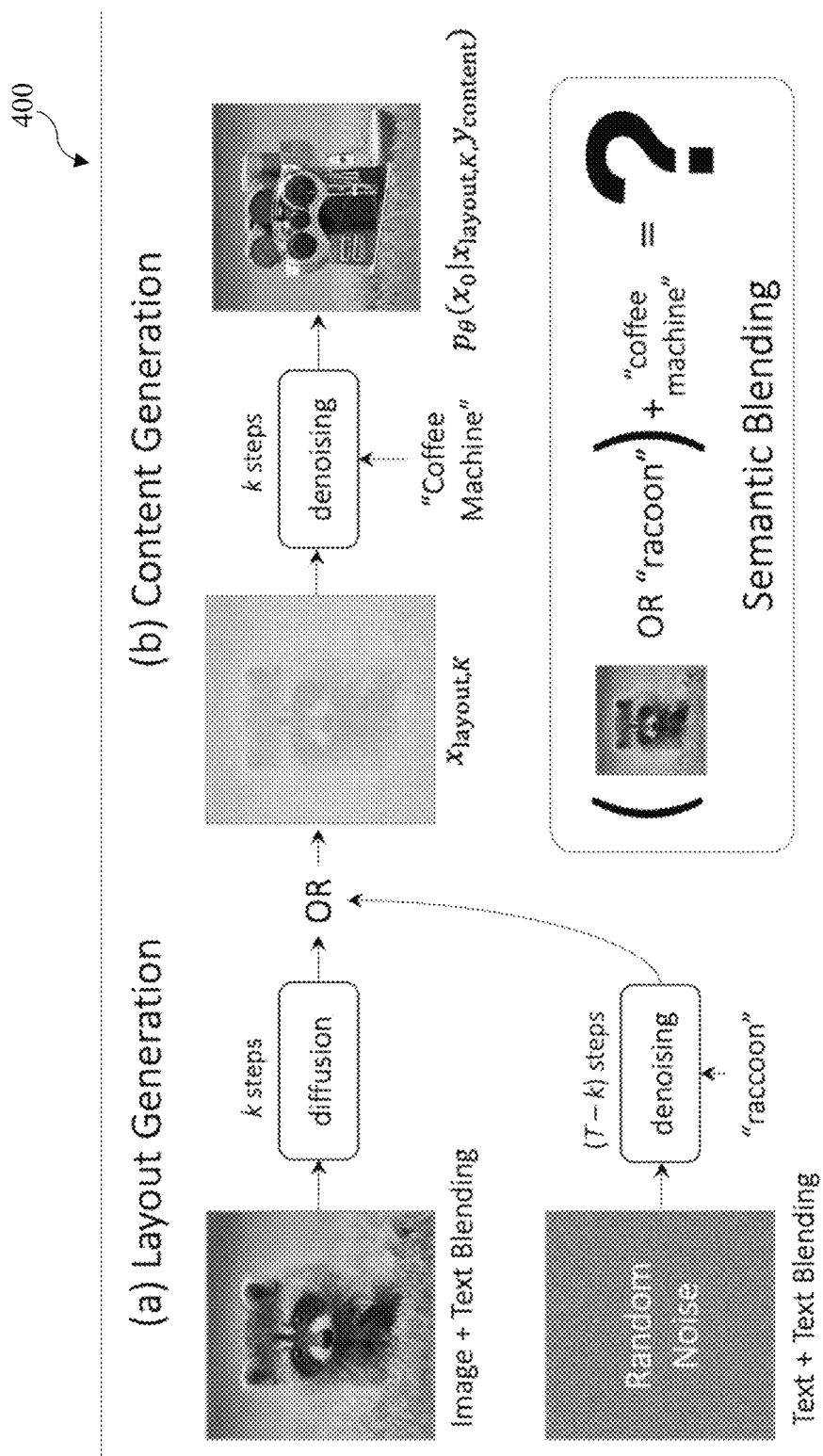
FIG. 4A illustrates an example process of generating an object using the system of FIG. 1, arranged in accordance with at least some embodiments described herein.

FIG. 4A illustrates an example process 400 of generating an object using the system 100 of FIG. 1, arranged in accordance with at least some embodiments described herein.

In an example embodiment, the process 400 includes a layout generation process (or a layout semantic generation process) and a content generation process (or a content semantic generation process). The layout generation process may include receiving and/or using an image or a text as an input (the first input, e.g., from the source 110 of FIG. 1) and generating a layout of an output object. The content generation process may receive and/or use a text as a second input (a content conditioner, e.g., from the source 110 of FIG. 1) and generate the output object by e.g., injecting the content conditioner for mixing (or synthesizing or blending) the layout generated from the layout generation process with the content corresponding to the content conditioner. It is to be understood that the process of mixing (or synthesizing or blending) the layout (color, shape, position, texture, etc.) semantic of the object corresponding to the first input, with the content semantic (e.g., the semantic category) of the object corresponding to the second input, may be referenced as "semantic blending". That is, semantic blending includes both the layout semantic generation process and the content semantic generation process. It is to be understood that semantic blending may include a process to combine the layout of one concept (e.g., the first input) with the semantic content of another (e.g., the second input) to synthesize a new concept (e.g., the output object).

As shown in FIG. 4A, using the non-limiting example of blending "raccoon" with "coffee machine", the layout generation process may include generating the layout (shape, color, position, texture, etc., including e.g., two dark or colored circles at or around the positions of the eyes of the raccoon) of the synthesized output object (e.g., a raccoon-alike coffee machine). The layout generation may be implemented differently depending on, e.g., the input type of the first input (e.g., whether the first input is an image of a raccoon or a "raccoon" text input).

In some embodiments, the total number of de-noising operations or iterations in a diffusing module may be T. In an example embodiment, when the first input is an image of a raccoon, the image of the raccoon may be corrupted by adding noise (e.g., Gaussian noise) for k operations or iterations (1<=k<=T) to generate the layout $x_{layout, k}$ of the output object. It is to be understood that such process (generating the layout based on the image input) may be a diffusion process.

In another example embodiment, when the first input is a "raccoon" text input, a random noise (e.g., a Gaussian) and the "raccoon" text input may be fed into a pre-trained text-to-image diffusion-based generative model, and the layout $x_{layout,\ k}$ of the output object may be generated by executing a de-noising process of the model for a number (T-k) operations or iterations. It is to be understood that such process (generating the layout based on the text input) may be a de-noising process.

As shown in FIG. 4A, the content generation process may take the layout $x_{layout,\ k}$ generated from the layout generation process, and inject or apply or add the content conditioner (e.g., the "coffee machine" text input) for mixing or blending the raccoon object and the coffee machine object by executing the de-noising process of the pre-trained text-to-image diffusion-based generative model for a number k operations or iterations with the "coffee machine" text input to generate a content of the output object and/or to generate the output object itself (e.g., a coffee machine that looks like a raccoon). It is to be understood that such process (generating the content of the output object or generating the output object based on the layout $x_{layout,\ k}$ and the content conditioner) may be a de-noising process (represented as $p_\theta(x_0|x_{layout,\ k},\ y_{content})$).

Figure 4B:
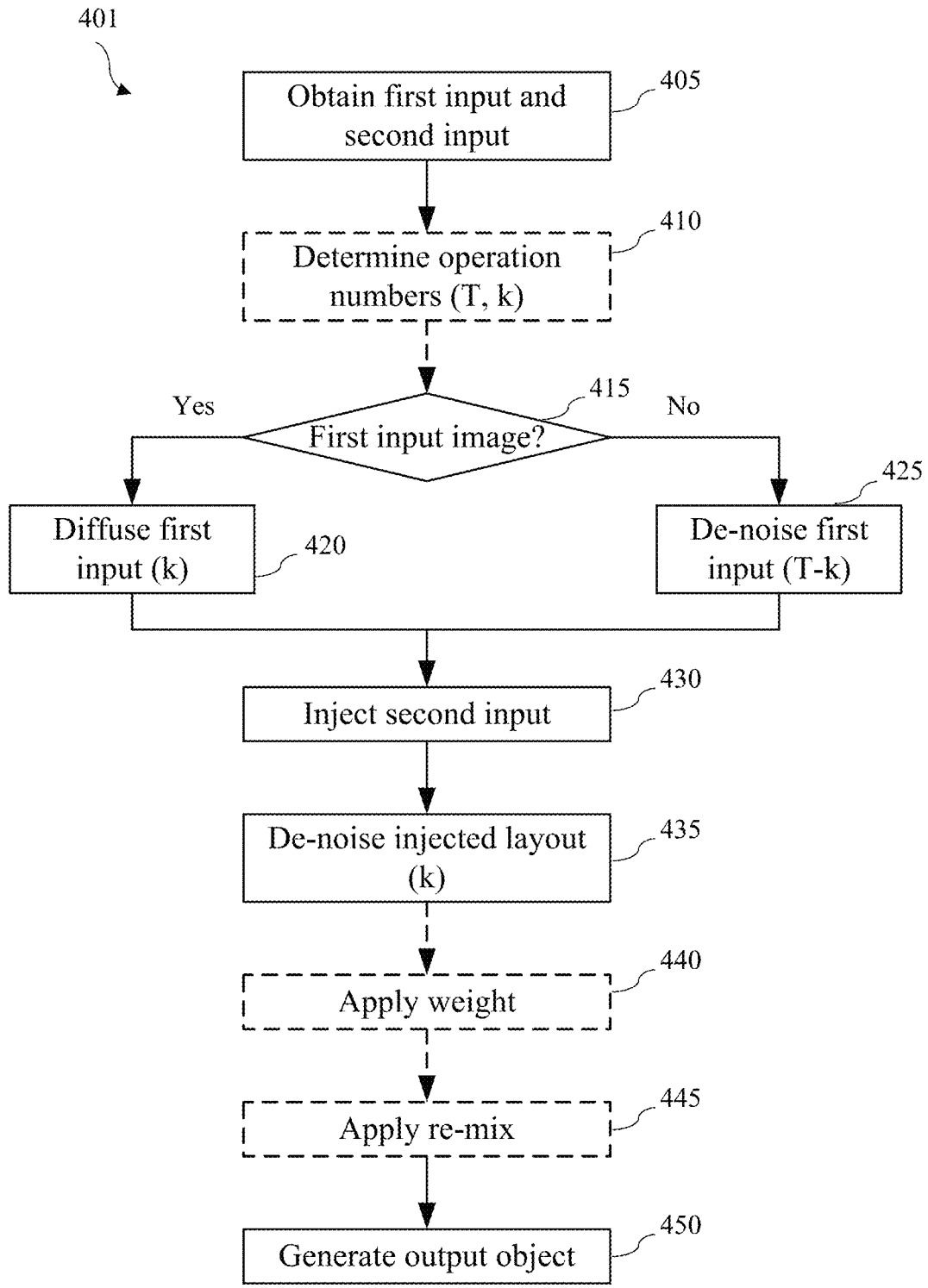
FIG. 4B is a flow chart illustrating an example processing flow of the process of FIG. 4A, in accordance with at least some embodiments described herein.

FIG. 4B is a flow chart illustrating an example processing flow 401 corresponding to the process 400 of FIG. 4A, in accordance with at least some embodiments described herein. It is to be understood that the processing flow 401 disclosed herein may be conducted by one or more processors (e.g., the central processor unit 705 of FIG. 7, or any other suitable processor) or one or more modules of FIG. 1, unless otherwise specified. The conducting processor may communicate with other components of the system 100 of FIG. 1.

It is also to be understood that the processing flow 401 may include one or more operations, actions, or functions as illustrated by one or more of blocks 405, 410, 415, 420, 425, 430, 435, 440, 445, and 450. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 401 may begin at block 405.

At block 405 (Obtain first input and second input), the processor may obtain or receive a first input (e.g., an image, a text, etc., for the layout generation process) and a second input (e.g., a text, etc. as a content conditioner for the content generation process) from e.g., the source 110 of FIG. 1. It is to be understood that the process at block 405 may be implemented e.g., in the control logic 160 of the generator 120 of FIG. 1. Processing may proceed from block 405 to block 410.

At the optional block 410 (Determine operation numbers (T, k)), the processor may generate a similarity value (e.g., N) by comparing an object corresponding to the first input and an object corresponding to the second input. The processor may determine the number of operation or the number of iterations (T, k) for the diffusion process and/or the de-noising process based on, e.g., the similarity and/or any other suitable factors. In an example embodiment, the number T may be 50, and the number k may be 25. In another example embodiment, the number T may be 1000, and the number k may be 500. It is to be understood that T and k are referenced herein only as non-limiting examples. That is, the number of T and/or k described herein are provided for descriptive purposes only and are not intended to be limiting. In another example embodiment, the processor may obtain or receive the operation numbers (T, k) e.g., from the source 110 of FIG. 1.

In an example embodiment, to improve the mixing or blending quality, the processor may adjust (e.g., increase, decrease, etc.) the number k to control the content generation and/or provide flexibility of what the generated content may look like. For example, when the first input is an image of a rabbit (see the source image of FIG. 5A), and the second input is a "coffee machine" text prompt or text input, the mixing or blending ratio of the two concepts or objects can be controlled (e.g., more like a "rabbit" versus more like a "coffee machine") by adjusting the number k of operations or iterations (or the point of time) at which or when the content generation process starts. If k is small (e.g., either as an absolute number or relative to T, e.g., when k is 5 while T is 100), most of the structural details of the rabbit may be preserved (since the number of operations or iterations for the diffusion process (e.g., k) is small) e.g., after executing the diffusing process for the number k operations or iterations, and there may be only a few operations or iterations left for the model to modify (e.g., for the de-noising process to modify the diffused rabbit image with the content conditioner "coffee machine"). If k is large (e.g., either as an absolute number or relative to T, e.g., when k is 85 while T is 100), most of the layout information of the rabbit may be corrupted e.g., after executing the diffusing process for the number k operations or iterations, and as a result, the model (e.g., the de-noising process of the model) may be given a higher flexibility to generate the desired content (e.g., modifying the diffused or corrupted rabbit image with the content conditioner "coffee machine"). In a case when k equals T, the semantic blending process may reduce to a text-to-image generation from a random Gaussian noise (e.g., the layout of the rabbit may completely disappear).

It is to be understood that a desired injection time (or a desired k, the desired number of operations or iterations) may be determined based on the determined semantic similarity value N between the two concepts. For example, as shown in the upper row of the images in FIG. 5A, when mixing or blending "rabbit" and "hamster" (two similar concepts or objects), the model may require fewer de-noising operations or iterations to generate features of the hamster due to the high level of similarity between a rabbit and a hamster (e.g., only need to modify the eyes and nose of the rabbit). As such, the number k may be adjusted (e.g., decreased) based on the determined similarity value N. In another example, as shown in the lower row of the images in FIG. 5A, when mixing or blending "rabbit" and "coffee machine" (two extremely dissimilar concepts or objects), the model may require more de-noising operations or iterations to generate the features of the coffee machine and/or to overwrite the rabbit details due to their high level of dissimilarity. As such, the number k may be adjusted (e.g., increased) based on the determined similarity value N.

Back to FIG. 4B, it is to be understood that the process at block 410 may be implemented e.g., as part of the control logic 160 and/or by the enhancer 170 of the generator 120 of FIG. 1. Processing may proceed from block 410 to block 415. At determination block 415 (First input image?), the processor may determine whether the first input is an image. It is to be understood that the process at block 415 may be implemented e.g., in the control logic 160 of the generator 120 of FIG. 1. When the first input is an image, processing may proceed from block 415 to block 420. When the first input is not an image (e.g., the first input is a text, etc.), processing may proceed from block 415 to block 425.

At block 420 (Diffuse first input (k)), the processor may diffuse or corrupt the first input image by adding noise (e.g., Gaussian noise) for k operations or iterations (determined at block 410) to generate the layout $x_{layout,\ k}$ of the output object. It is to be understood that such process (generating the layout based on the image input) may be a diffusion process. It is also to be understood that the process at block 420 may be implemented e.g., by the diffusing module 140 of the model 130 of FIG. 1. Processing may proceed from block 420 to block 430.

At block 425 (De-noise first input (T–k)), the processor may feed, apply, or send a random noise (e.g., a Gaussian) and the first input text into the model 130 of FIG. 1, and the layout $x_{layout,\ k}$ of the output object may be generated by executing a de-noising process of the model for a number (T–k, determined at block 410) of operations or iterations. It is to be understood that such process (generating the layout based on the text input) may be a de-noising process. It is also to be understood that the process at block 425 may be implemented e.g., by the de-noising module 150 of the model 130 of FIG. 1. Processing may proceed from block 425 to block 430.

At block 430 (Inject second input), the processor may inject or apply or add the second input (e.g., a text, etc.) as a content conditioner (to be applied to the layout $x_{layout,\ k}$) to the model 130 of FIG. 1. Processing may proceed from block 430 to block 435. It is to be understood that in an example embodiment, block 430 (the injecting process) and block 435 (the de-noising process) can be combined as a single process.

At block 435 (De-noise inject layout (k)), the processor may receive the layout $x_{layout,\ k}$ generated from the layout generation process (e.g., at block 420 or 425), run the de-noising process of the model for k operations or iterations with the injected second input to generate a content of the output object and/or to generate the output object itself (e.g., including both the layout and the content) for mixing or blending an object corresponding to the first input and an object corresponding to the second input. It is to be understood that such process (generating the content of the output object or generating the output object based on the layout $x_{layout,\ k}$ and the content conditioner) may be a de-noising process. It is also to be understood that the process at blocks 430 and/or 435 may be implemented e.g., as part of the control logic 160 of the generator 120 (e.g., for passing or sending the second input to the model 130) and/or by the de-noising module 150 of the model 130 of FIG. 1. Processing may proceed from block 435 to block 440.

At the optional block 440 (Apply weight), the processor may apply weighted text-image or image-text cross-attention (e.g., by changing a weight value s) when running the model (e.g., the diffusion process and/or the de-noising process), e.g., to the conditioner. As referenced herein, "attention" may refer to a technique that mimics cognitive attention. The effect of attention may enhance some parts of the input data while diminishing other parts. Learning which part of the data is to be enhanced rather than or before another depends on the semantic context. It is to be understood that text-image or image-text cross-attention may enable attention with context from both image and text, and may infer the text-image or image-text similarity by aligning image region and text features.

It is also to be understood that the processor may re-weigh (e.g., by changing a weight value s) the text-image or image-text cross-attention to increase or reduce the magnitude of a concept. For example, for a text-image cross-attention map M (a real data distribution in the space of the number of spatial and text tokens) and a conditional prompt y="a photo of tiger", the map M may be scaled corresponding to the "tiger" token with a value "s" while keeping the remaining map M unchanged. In an example embodiment, "s" may range from –D to D, with D being a number (for example, D=2, etc.). In an example embodiment, as shown in FIG. 5B (where s changes from 0.5 to 1.0 to 2.0), increasing "s" may result in more elements of "tiger" being injected into the synthesis (the generated output object).

In another example embodiment, applying a negative "s" (e.g., to the conditioner) may lead to a different behavior: given a rabbit image and a conditioning prompt y="a photo of rabbit", using a negative value "s" may amount to executing the model (e.g., the diffusion process and/or the de-noising process) to generate an image with a layout similar to that of rabbit while its content is non-rabbit. In the example embodiment of FIG. 5B (where "s" changes from 0 to –0.5 to –1.0), when "rabbit" content is eliminated (e.g., by applying a negative s), the model may generate more probable non-rabbit content (e.g., when decreasing s to a maximum negative value "–D"). That is, decreasing the negative s (or increasing the absolute value of the negative s) may result in more elements of "rabbit" being replaced by non-rabbit contents.

Back to FIG. 4B, it will be appreciated that the weight value s (positive or negative value) may be applied to e.g., the content conditioner (e.g., to inject more elements of the content conditioner into the synthesis or to replacing more elements of the content conditioner with elements of non-content-conditioner in the synthesis). Processing may proceed from block 440 to block 445.

At the optional block 445 (Apply re-mix), the processor may repeatedly add noise (e.g., to an intermediate output during the de-noising process at block 435) and de-noising (e.g., the diffused/corrupted intermediate output) for a number of operations or iterations when executing the model 130. For example, when two concepts or objects (e.g., corresponding to the first input and the second input respectively) are not well blended (e.g., the resultant content is completely dominated by the content conditioner), the processor may repeatedly add noise (e.g., to an intermediate output during the de-noising process at block 435) and de-noising (e.g., the diffused/corrupted intermediate output) to improve the mixing or blending quality. In an example embodiment, given the model prediction $x_{k-1}$ using $x_k$ (e.g., a de-noising operation or iteration in a diffusion model, where $x_{k-1}$ is the intermediate output, see the description of FIG. 3), the processor may diffuse $x_{k-1}$ back to $x_k$ and de-noise $x_k$ again to generate $x_{k-1}$. Such a process (diffusing the intermediate output $x_{k-1}$ to obtain $x_k$, and de-noising $x_k$ again to generate the $x_{k-1}$) may be referred to as a re-mix. It is to be understood that re-mix may be repeatedly applied, leading to a better mixing or blending. In an example embodiment, as shown in FIG. 5C, when mixing or blending the concepts of "polar bear" and "sea lion", applying more rounds of re-mix may lead to a better mixing or blending quality (see the changes in the polar bear's face and hands in FIG. 5C).

Back to FIG. 4B, it is to be understood that the process at blocks 440 and/or 445 may be implemented e.g., by the enhancer 170 of the generator 120 of FIG. 1. It is also to be understood that the process at blocks 440 and/or 445 may be applied in the processes at one or more of blocks 420-435. Processing may proceed from block 445 to block 450.

At block 450 (Generate output object), the processor may generate the output object using the model 130 of FIG. 1. It is to be understood that the output object includes the layout generated at block 420 or 425 and the content generated at block 435, with optional enhancement processes from block 440 and/or 445 applied when generating the output object. It is also to be understood that block 450 may be combined with or may be a part of block 435.

It is to be understood that the process at block 450 may be implemented e.g., as part of the control logic 160 of the generator 120 (e.g., for passing or sending the second input to the model 130) and/or in the de-noising module 150 of the model 130 of FIG. 1. It is also to be understood that the model 130 of FIG. 1 may be a pre-trained model, and that the processes in the processing flow 401 do not require the model 130 to be trained or retrained to generate the output object during the process 401.

Figure 4C:
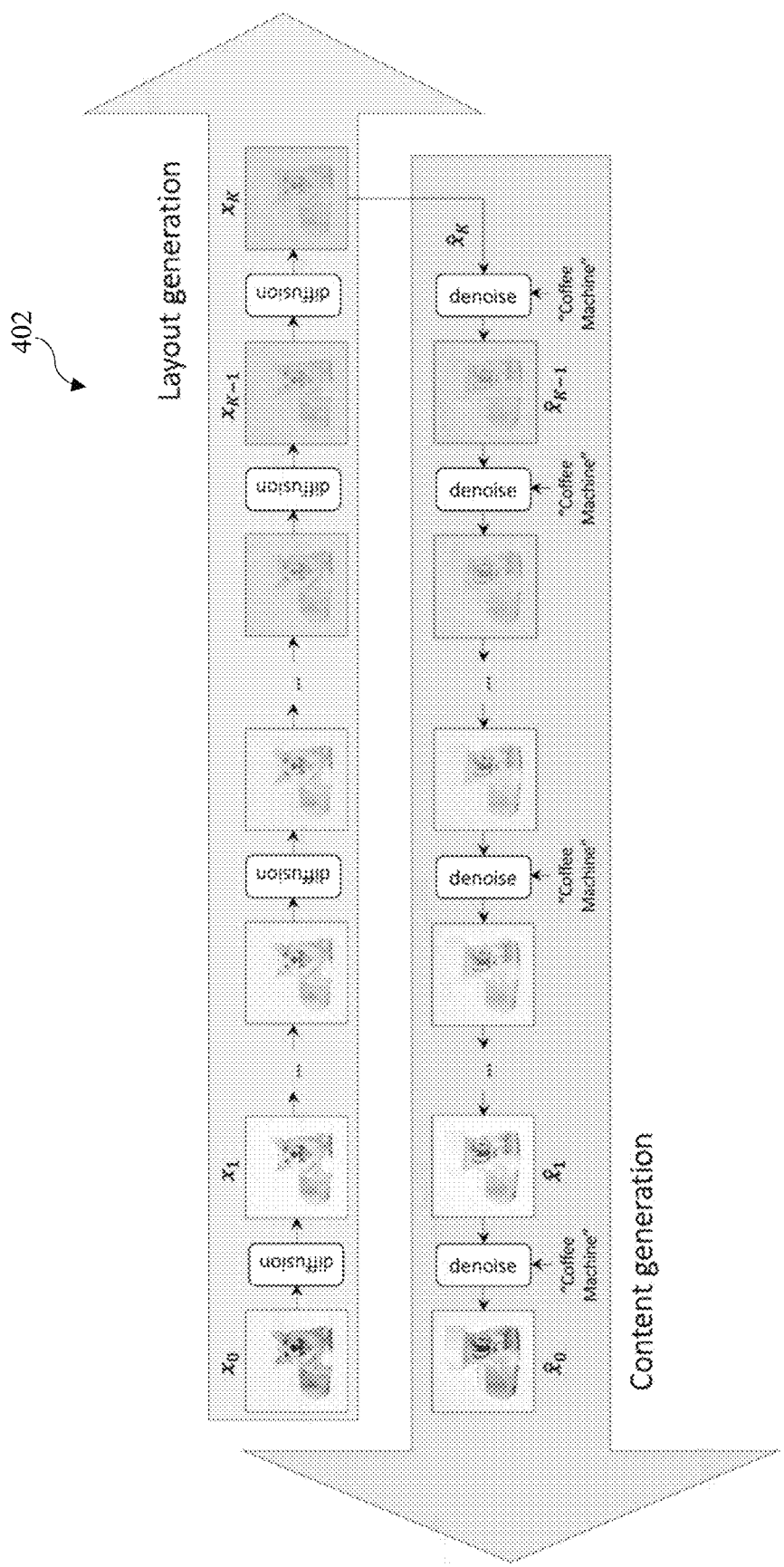
FIG. 4C illustrates an example process of generating an object using the system of FIG. 1, arranged in accordance with at least some embodiments described herein.

FIG. 4C illustrates an example process 402 of generating an object using the system of FIG. 1, arranged in accordance with at least some embodiments described herein. It will be appreciated that the layout generation process and the content generation process shown in FIG. 4C are the same as the layout generation process and the content generation process described in FIGS. 4A and 4B, unless it is explicitly specified otherwise.

As shown in FIG. 4C, a diffusion process may be used in the layout generation process to generate a layout (e.g., of the output object). The diffusion process starts with a process node "$x_0$". In an example embodiment, the process node $x_0$ receives an image as an input. The diffusion process (and the de-noising process) may include a certain number (e.g., the number K, i.e., the number k in FIGS. 4A and 4B) of operations or iterations from the process node $x_0$ to the process node $x_K$ ($x_0 \rightarrow x_K$). From $x_0$, the diffusion process may add noise such as Gaussian noise to the image (e.g., to corrupt the image) to generate a diffused or corrupted image (e.g., at $x_1$). The diffusion process may repeatedly add noise to the diffused image generated at a previous process node (see the images at $x_1 \rightarrow x_K$), and at $x_K$, a layout image is generated or obtained.

As shown in FIG. 4C, a de-nosing process may be used in the content generation process to generate a content of the output object (and/or to generate the output object itself including both the layout and the content), given a content conditioner (e.g., a conditional text prompt "coffee machine", etc.) to mix or blend the two concepts (i.e., the source image at $x_0$ and the object corresponding to the content conditioner). The de-noising process starts with a process node "$\hat{x}_K$". In an example embodiment, the process node $\hat{x}_k$ receives the layout image at $x_k$ as an input. From $\hat{x}_k$, the de-noising process may de-noise (e.g., remove or filter noise such as Gaussian noise from) the layout image given the content conditioner to generate a de-noised, mixed, and/or blended image (e.g., at $\hat{x}_{K-1}$). The de-noising process may de-noise the layout image (and mix or blend with the object corresponding to the content conditioner) from a previous process node and at $\hat{x}_0$, the de-noised, mixed, and/or blended image becomes the output image. That is, the de-noising process may repeatedly de-noise the layout image at $x_k$ to generate a de-noised, mixed, and/or blended image after K operations or iterations ($\hat{x}_K \rightarrow \hat{x}_0$).

Figure 4D:
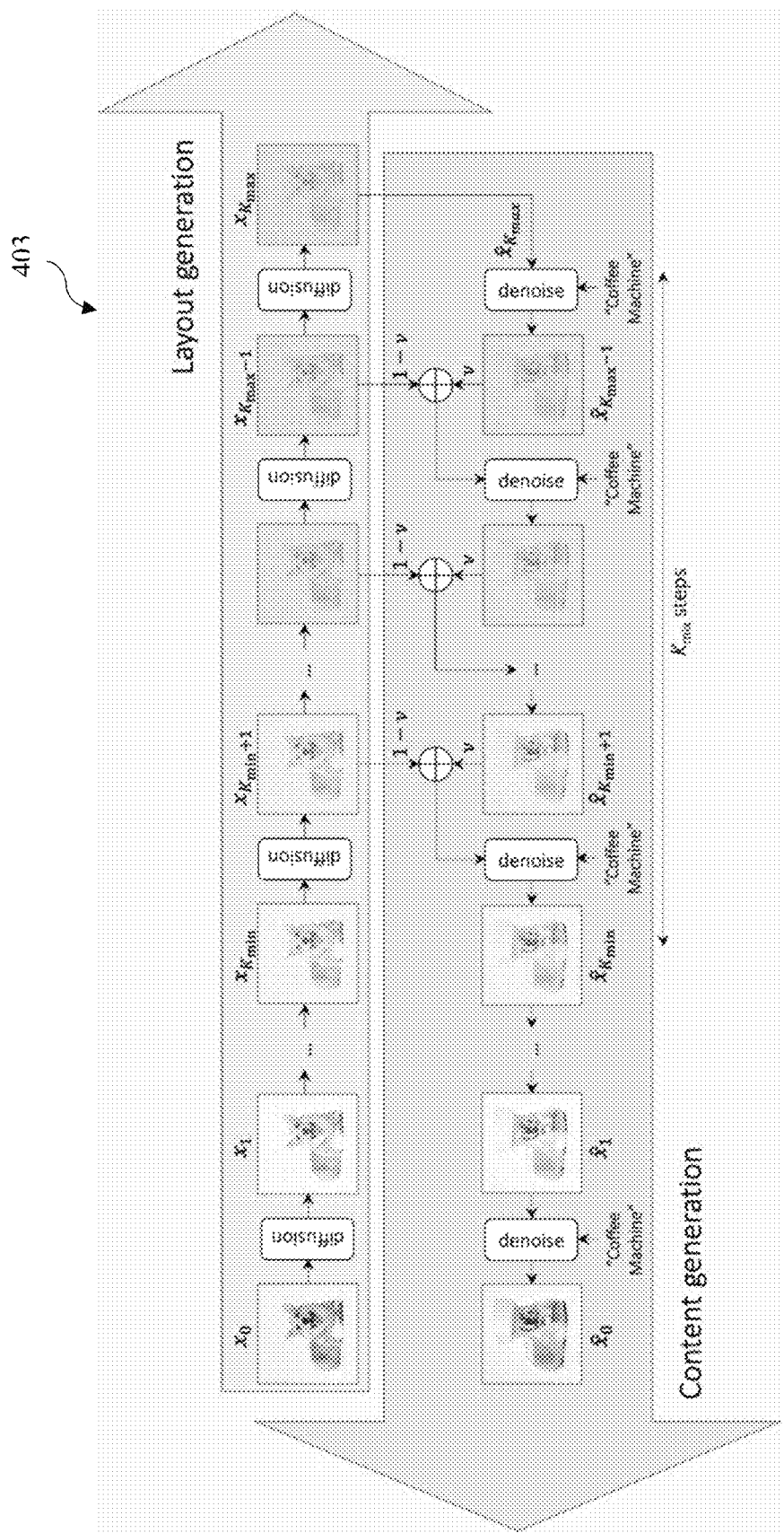
FIG. 4D illustrates another example process of generating an object using the system of FIG. 1, arranged in accordance with at least some embodiments described herein.

FIG. 4D illustrates another example process 403 of generating an object using the system of FIG. 1, arranged in accordance with at least some embodiments described herein. It will be appreciated that the layout generation process and the content generation process shown in FIG. 4D are the same as the layout generation process and the content generation process described in FIGS. 4A, 4B, and 4C, unless it is explicitly specified below.

As shown in FIG. 4D, the diffusion process (and the de-noising process) may include a certain number (e.g., the number $K_{max}$, i.e., the number k in FIGS. 4A and 4B) of operations or iterations e.g., from the process node $x_0$ to the process node $x_K$ ($x_0 \rightarrow x_{Kmax}$).

As shown in FIG. 4D, in the de-noising process, the layout image from $\hat{x}_{kmax}$ (which receives the layout image at $x_{kmax}$ as an input) is de-noised given the content conditioner, and the de-noised, mixed, and/or blended image is generated at $\hat{x}_{kmax-1}$. In order to incorporate more details from the layout image, the image at $\hat{x}_{kmax-1}$ (from the content generation process) and the image at $\hat{x}_{Kmax-1}$ (from the layout generation process) may be linearly combined e.g., via "v*(image at $\hat{x}_{kmax-1}$)+(1−v)*(image at $\hat{x}_{Kmax-1}$)→linearly combined image at $\hat{x}_{kmax-1}$" to generate a linearly combined image at $\hat{x}_{kmax-1}$. For example, for the de-noise process for $\hat{x}_{kmax-1}$, the linearly combined image at $\hat{x}_{kmax-1}$ instead of the image at $\hat{x}_{kmax-1}$ may be used as the input of the de-noise process (given the content conditioner) to generate the de-nosed, mixed, and/or blended image at $\hat{x}_{kmax-2}$. Such process may be referred as "applying the linear combination". Applying the linear combination may be repeated for $K_{mix}$ (i.e., $K_{max}-K_{min}$) number of operations or iterations. In an example embodiment, after $K_{mix}$ number of operations or iterations, the linear combination may not be applied and image at $\hat{x}_0$ is generated using regular de-noising process (i.e., de-noising process without applying the linear combination). In an example embodiment, the number v is equal to or greater than zero and is less than or equal to one. It is to be understood that when v is equal to one, the de-nosing process of FIG. 4D may be the same as the de-noise process of FIG. 4C (i.e., no linear combination is applied). It is also to be understood that for the given number T (see descriptions in FIGS. 4A and 4B), the number $K_{max}$ (i.e., the number k in FIGS. 4A and 4B) may be equal to or around 0.6*T, and the number $K_{min}$ may be equal to or around 0.3*T.

Figure 5A:
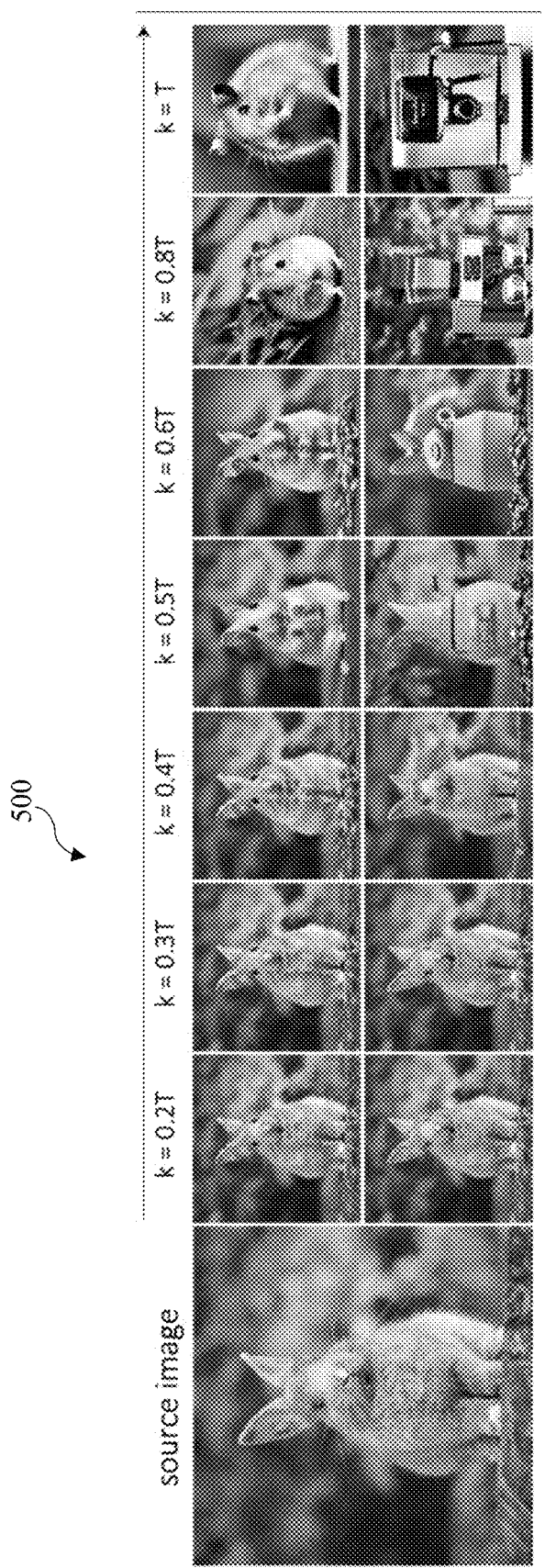
FIG. 5A illustrates example images resulting from adjusting the injection time using the model of FIG. 1, arranged in accordance with at least some embodiments described herein.
Figure 5B:
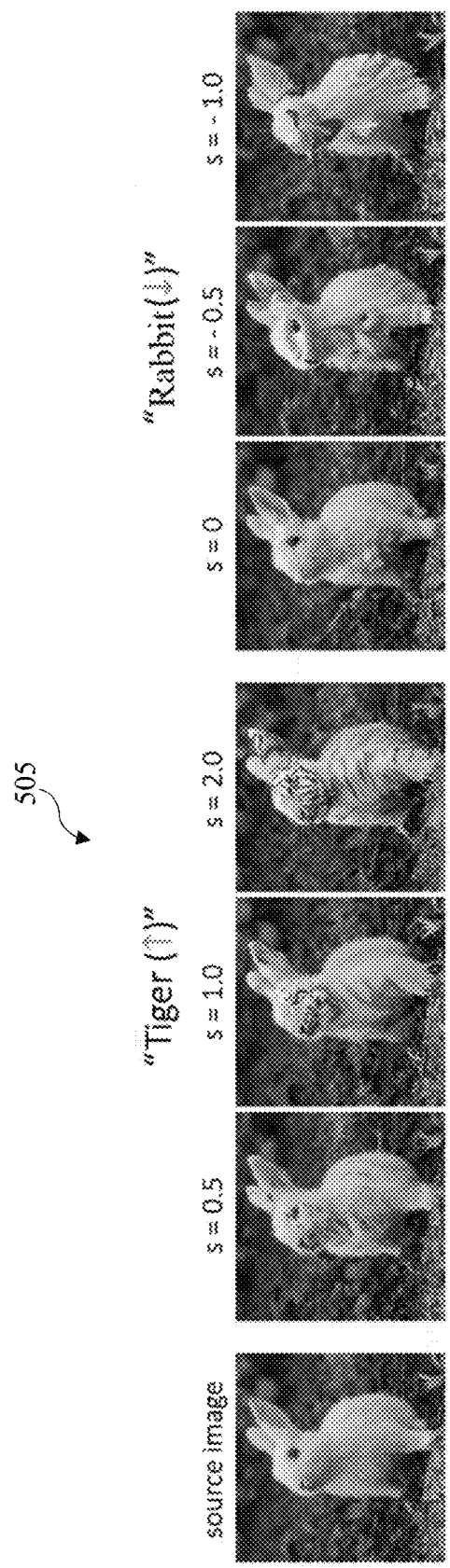
FIG. 5B illustrates example images resulting from applying positive or negative weighted text-image or image-text cross-attention, arranged in accordance with at least some embodiments described herein.
Figure 5C:
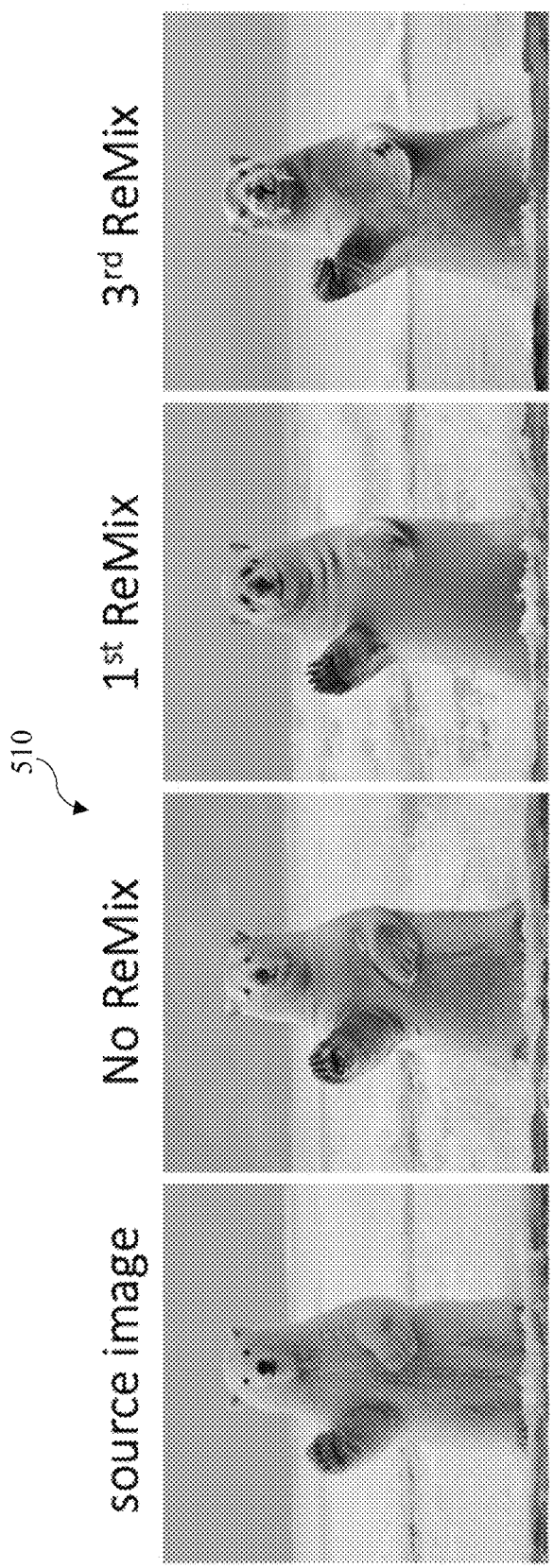
FIG. 5C illustrates example images resulting from applying various rounds of re-mix, arranged in accordance with at least some embodiments described herein.

FIG. 5A illustrates example images 500 resulting from adjusting the injection time using the model of FIG. 1, arranged in accordance with at least some embodiments described herein. As shown in the upper row of the images, when mixing or blending "rabbit" and "hamster" (two similar concepts or objects), the model may require a smaller number k of de-noising operations or iterations to generate features of the hamster due to the high level of similarity between a rabbit and a hamster (e.g., only need to modify the eyes and nose of the rabbit). As such, the number k may be adjusted (e.g., decreased) based on the similarity value compared with a desired value (e.g., when a difference between the similarity value and the desired value is not greater than a threshold value). As shown in the lower row of the images, when mixing or blending "rabbit" and "coffee machine" (two extremely dissimilar concepts or objects), the model may require a larger number k of de-noising operations or iterations to generate the features of the coffee machine and/or to overwrite the rabbit details due to their high level of dissimilarity. As such, the number k may be adjusted (e.g., increased) based on the similarity value compared with the threshold value (e.g., when a difference between the similarity value and the desired value is greater than the threshold value).

FIG. 5B illustrates example images 505 resulting from applying positive or negative weighted text-image or image-text cross-attention, arranged in accordance with at least some embodiments described herein. In an example embodiment, the source image is a rabbit, a conditional prompt (the content conditioner) y="a photo of tiger", and the weight s changes from 0.5 to 1.0 to 2.0. In such embodiment, increasing "s" may result in more elements of "tiger" being injected into the synthesis (the generated output object). When the source image is a rabbit, and the weight "s" changes from 0 to −0.5 to −1.0 (e.g., applied to a content conditioner "rabbit"), the "rabbit" content may be eliminated (e.g., by applying a negative s), the model may generate more probable non-rabbit content. That is, decreasing the negative s (or increasing the absolute value of the negative s) may result in more elements of "rabbit" being replaced by non-rabbit content.

FIG. 5C illustrates example images 510 resulting from applying various rounds of re-mix, arranged in accordance with at least some embodiments described herein. In an example embodiment, when mixing or blending the concepts of "polar bear" and "sea lion", applying more rounds of re-mix may lead to a better mixing or blending quality (see the changes in the polar bear's face and hands).

Figure 5D:
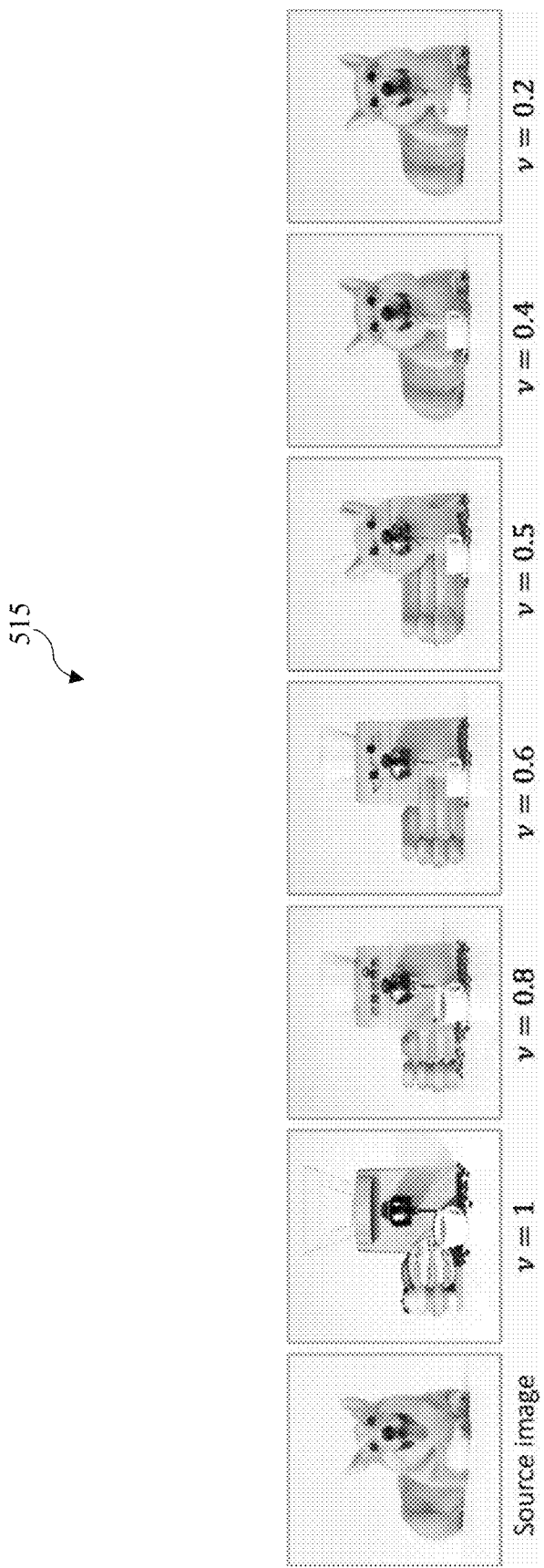
FIG. 5D illustrates example images resulting from applying the linear combination, arranged in accordance with at least some embodiments described herein.

FIG. 5D illustrates example images 515 resulting from applying the linear combination (see description of FIG. 4D), arranged in accordance with at least some embodiments described herein. It is to be understood that when v is equal to one, no linear combination is applied to the de-noise process. FIG. 5D shows the effect of reducing the number v (e.g., from 1 to 0.2) so that more layout details may be preserved in the final generated output.

Figure 6:
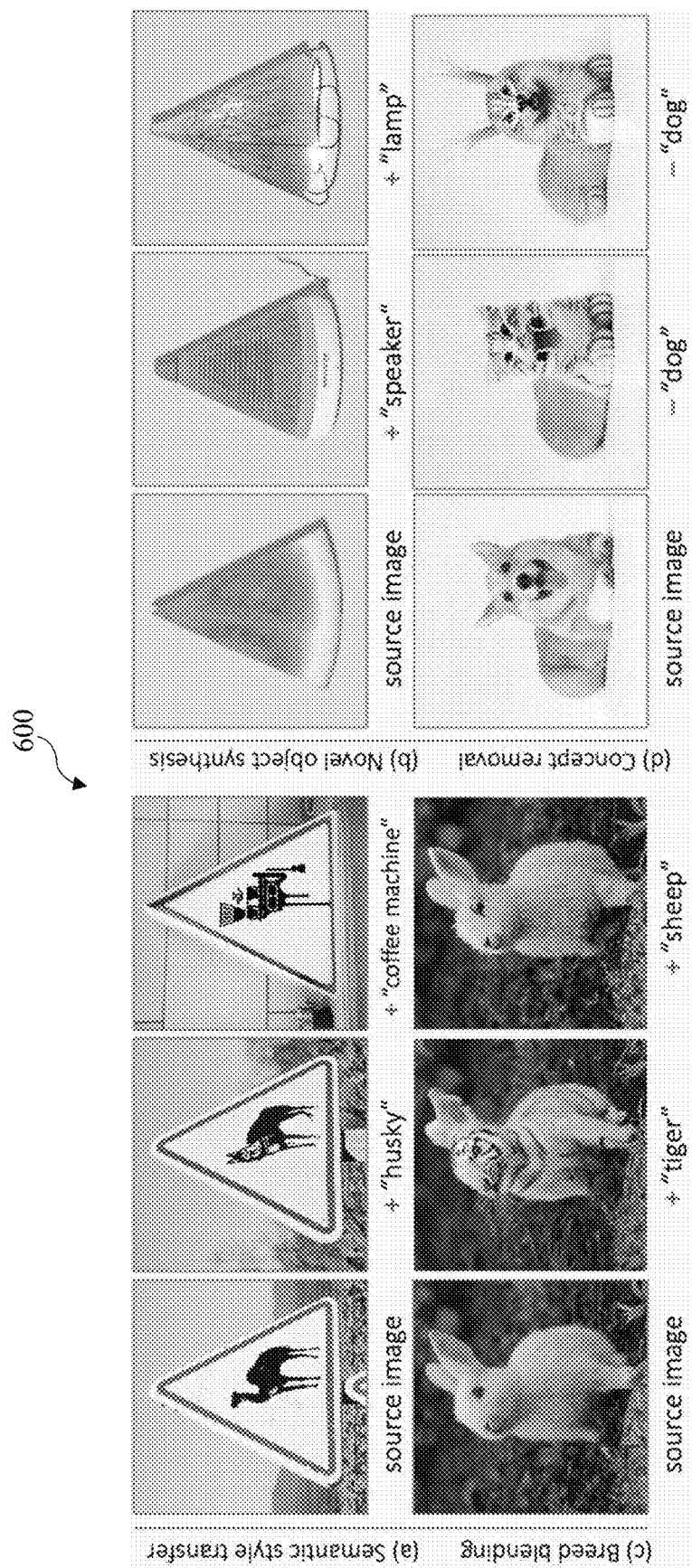
FIG. 6 illustrates example images of various applications of generating an object of mixed concepts, arranged in accordance with at least some embodiments described herein.

FIG. 6 illustrates example images 600 of various applications of generating an object of mixed concepts, arranged in accordance with at least some embodiments described herein.

FIG. 6(a) illustrates an application ("semantic style transfer") of generating an object of mixed concepts. FIG. 6(a) shows a generated a new sign given a reference sign (the source image) layout and a certain desired content (e.g., a "husky" or a "coffee machine") semantic. FIG. 6(b) illustrates another application ("novel object synthesis") of generating an object of mixed concepts. FIG. 6(b) shows a generated speaker or lamp that looks like a watermelon slice (the source image). FIG. 6(c) illustrates yet another application ("breed blending") of generating an object of mixed concepts. FIG. 6(c) shows a generated new animal species by mixing e.g., a species "rabbit" (the source image) and another species "tiger" or "sheep". FIG. 6(d) illustrates yet another application ("concept removal", e.g., by applying a negative weight on the content conditioner) of generating an object of mixed concepts. FIG. 6(d) shows synthesizing a non-dog object (by eliminating or removing the concept or features of a "dog" from the source image; or by replacing the concept or features of a "dog" with non-dog features; etc.) that looks like a dog (the source image). It is to be understood that FIG. 6(d) shows two non-dog objects, each is generated based on the source image (e.g., given the negative content conditioner and each given different initial Gaussian noise). It is also to be understood that in FIG. 6, except the source image, other inputs (e.g., "husky", "coffee machine", "speaker", "dog", etc.) may be content conditioners (e.g., text, etc.).

It is to be understood that other applications (e.g., "identity mixing", for mixing of two human identities where the synthesized human contains the distinctive features of the mixed identities; "pose transfer", for synthesizing a human identity with a desired pose of another object or human, where the original identity is no longer preserved; etc.) of generating an object of mixed concepts may be developed and implemented using the features in the embodiments disclosed herein. It is also to be understood that the applications described herein may pave a new direction in the computational graphics field and provides new possibilities for artificial intelligence-aided designs for artists in many fields, such as entertainment, cinematography, and computer-generated imagery effects.

Figure 7:
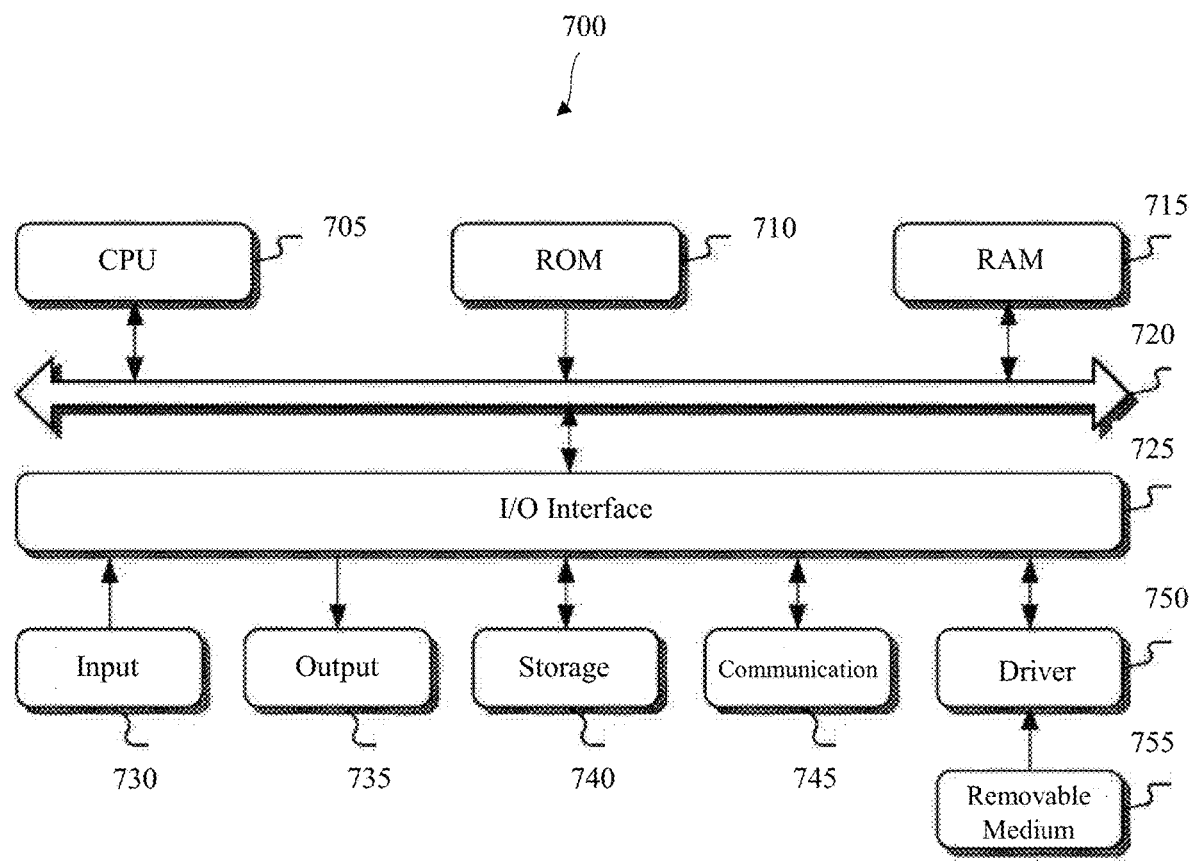
FIG. 7 is a schematic structural diagram of an example computer system applicable to implementing an electronic device, arranged in accordance with at least some embodiments described herein.

FIG. 7 is a schematic structural diagram of an example computer system 700 applicable to implementing an electronic device (for example, the source device 110 of FIG. 1, the device hosts, implements, executes, and/or stores the generator 120 of FIG. 1, etc.), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 714 may also store various data and programs required for operations of the system 700. The CPU 705, the ROM 710, and the RAM 720 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

It is to be understood that the processes described with reference to the flowchart of FIG. 4B and/or described in other figures may be implemented as computer software programs. The computer program product may include a computer program stored in a computer readable non-volatile medium. The computer program includes program codes for performing the method shown in the flowchart and/or process. In this embodiment, the computer program may be downloaded and installed from the network via the communication device 745, and/or may be installed from the removable medium 755. The computer program, when being executed by the central processing unit (CPU) 705, can implement the above functions specified in the method in the embodiments disclosed herein.

It is also to be understood that features in the embodiments described herein may provide a semantic blending process to synthesize, generate, or create an object of mixed concepts with high fidelity. Features in the embodiments described herein may also provide a pre-trained text-to-image diffusion-based generative model, and factorize the semantic blending process into (1) a layout generation process, responsible for describing the shape and color layout of the synthesis, and (2) a content generation process for injecting the desired concept for mixing. Features in the embodiments described herein may further provide better control and flexibility over the generated content by, e.g., (1) controlling the time (step or operation or iteration) for injection of content conditioner, (2) re-weighting image-text cross-attention, and (3) re-mix by repeatedly corrupting and de-noising an intermediate output to improve the mixing or blending quality.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method for generating an object using a diffusion model, the method comprising: obtaining a first input and a second input; and synthesizing an output object from the first input and the second input by: generating a layout of the output object from the first input; injecting the second input as a content conditioner to the layout of the output object; and de-noising the layout of the output object injected with the content conditioner to generate a content of the output object.

Aspect 2. The method of aspect 1, wherein the generating of the layout of the output object includes corrupting the first input by adding Gaussian noise.

Aspect 3. The method of aspect 2, wherein the first input is an image, the second input is a text, and the synthesizing of the output object is performed using a pre-trained text-to-image diffusion-based generative model.

Aspect 4. The method of aspect 2 or aspect 3, wherein a number of operations for corrupting the first input is equal to a number of operations for de-noising the layout of the output object injected with the content conditioner.

Aspect 5. The method of aspect 4, further comprising: when an object corresponding to the first input and an object corresponding to the second input have a similarity greater than a threshold value, decreasing the number of operations for de-noising the layout of the output object injected with the content conditioner.

Aspect 6. The method of aspect 4 or aspect 5, further comprising: when an object corresponding to the first input and an object corresponding to the second input have a similarity not greater than a threshold value, increasing the number of operations for de-noising the layout of the output object injected with the content conditioner.

Aspect 7. The method of any one of aspects 1-6, wherein the generating of the layout of the output object includes:

applying a random noise to the first input; and de-noising the first input applied with the random noise to generate the layout of the output object.

Aspect 8. The method of aspect 7, wherein the noise is Gaussian noise.

Aspect 9. The method of aspect 7 or aspect 8, wherein the first input is a text, and the second input is a text.

Aspect 10. The method of aspect 9, wherein de-noising the first input applied with the random noise includes de-noising the first input applied with the random noise using a pre-trained text-to-image diffusion-based generative model.

Aspect 11. The method of aspect 10, wherein a number of operations for de-noising the first input applied with the random noise, combined with a number of operations for de-noising the layout of the output object injected with the content conditioner, is equal to a number of operations for the model de-noising a noise input to generate an image.

Aspect 12. The method of aspect 11, further comprising: when an object corresponding to the first input and an object corresponding to the second input have a similarity greater than a threshold value, decreasing the number of operations for de-noising the layout of the output object injected with the content conditioner.

Aspect 13. The method of aspect 11 or aspect 12, further comprising: when an object corresponding to the first input and an object corresponding to the second input have a similarity not greater than a threshold value, increasing the number of operations for de-noising the layout of the output object injected with the content conditioner.

Aspect 14. The method of any one of aspects 1-13, wherein the output object is an image.

Aspect 15. The method of any one of aspects 1-14, further comprising: applying a weight to the content conditioner to adjust a number of elements corresponding to the second input to be injected to the layout of the output object.

Aspect 16. The method of aspect 15, further comprising: increasing the weight to increase the number of elements corresponding to the second input to be injected to the layout of the output object.

Aspect 17. The method of aspect 15 or aspect 16, further comprising: decreasing the weight to decrease the number of elements corresponding to the second input to be injected to the layout of the output object.

Aspect 18. The method of any one of aspects 15-17, wherein the weight is a positive weight for adding elements corresponding to the second input to the layout of the output object.

Aspect 19. The method of any one of aspects 15-18, wherein the weight is a negative weight for replacing elements corresponding to the second input with elements not corresponding to the second input.

Aspect 20. The method of any one of aspects 1-19, further comprising: during de-noising the layout of the output object injected with the content conditioner, diffusing an intermediate output object and then de-noising the diffused intermediate output object.

Aspect 21. A non-transitory computer-readable medium having computer-executable instructions stored thereon that, upon execution, cause one or more processors to perform operations comprising: obtaining a first input and a second input; and synthesizing an output object from the first input and the second input by: generating a layout of the output object from the first input; injecting the second input as a content conditioner to the layout of the output object; and de-noising the layout of the output object injected with the content conditioner to generate a content of the output object.

Aspect 22. The computer-readable medium of aspect 21, wherein the generating of the layout of the output object includes: applying a random noise to the first input; and de-noising the first input applied with the random noise to generate the layout of the output object.

Aspect 23. The computer-readable medium of aspect 21 or aspect 22, wherein the operations further comprise: applying a weight to the content conditioner to adjust a number of elements corresponding to the second input to be injected to the layout of the output object.

Aspect 24. A generator for generating an object using a diffusion model, the generator comprising: a control logic module to obtain a first input and a second input; a model to synthesize an output object from the first input and the second input by: generating a layout of the output object from the first input; injecting the second input as a content conditioner to the layout of the output object; and de-noising the layout of the output object injected with the content conditioner to generate a content of the output object.

Aspect 25. The generator of aspect 24, further comprising: an enhancer to apply a weight to the content conditioner to adjust a number of elements corresponding to the second input to be injected to the layout of the output object.

Aspect 26. The generator of aspect 24 or aspect 25, wherein the model is a pre-trained text-to-image diffusion-based generative model.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for generating an object using a diffusion model, the method comprising:
    obtaining a first input and a second input; and
    synthesizing an output object from the first input and the second input by:
        generating a layout of the output object from the first input by corrupting the first input by adding Gaussian noise;
        adding the second input as a content conditioner to the layout of the output object; and
        de-noising the layout of the output object added with the content conditioner to generate a content of the output object, wherein a number of operations for corrupting the first input is equal to a number of operations for de-noising the layout of the output object added with the content conditioner, and wherein, when an object corresponding to the first input and an object corresponding to the second input have a similarity greater than a threshold value, decreasing the number of operations for de-noising the layout of the output object added with the content conditioner.

2. The method of claim 1, wherein the first input is an image, the second input is a text, and the synthesizing of the output object is performed using a pre-trained text-to-image diffusion-based generative model.

3. The method of claim 1, further comprising:
when an object corresponding to the first input and an object corresponding to the second input have a similarity not greater than a threshold value, increasing the number of operations for de-noising the layout of the output object added with the content conditioner.

4. The method of claim 1, wherein the generating of the layout of the output object includes:
applying a random noise to the first input; and
de-noising the first input applied with the random noise to generate the layout of the output object.

5. The method of claim 4, wherein the first input is a text, and the second input is a text.

6. The method of claim 5, wherein de-noising the first input applied with the random noise includes de-noising the first input applied with the random noise using a pre-trained text-to-image diffusion-based generative model.

7. The method of claim 6, wherein a number of operations for de-noising the first input applied with the random noise, combined with a number of operations for de-noising the layout of the output object added with the content conditioner, is equal to a number of operations for the model de-noising a noise input to generate an image.

8. The method of claim 7, further comprising:
when an object corresponding to the first input and an object corresponding to the second input have a similarity greater than a threshold value, decreasing the number of operations for de-noising the layout of the output object added with the content conditioner.

9. The method of claim 7, further comprising:
when an object corresponding to the first input and an object corresponding to the second input have a similarity not greater than a threshold value, increasing the number of operations for de-noising the layout of the output object added with the content conditioner.

10. The method of claim 1, further comprising:
applying a weight to the content conditioner to adjust a number of elements corresponding to the second input to be added to the layout of the output object.

11. The method of claim 1, further comprising:
during de-noising the layout of the output object added with the content conditioner, diffusing an intermediate output object and then de-noising the diffused intermediate output object.

12. A non-transitory computer-readable medium having computer-executable instructions stored thereon that, upon execution, cause one or more processors to perform operations comprising:
obtaining a first input and a second input; and
synthesizing an output object from the first input and the second input by:
generating a layout of the output object from the first input by corrupting the first input by adding Gaussian noise;
adding the second input as a content conditioner to the layout of the output object; and
de-noising the layout of the output object added with the content conditioner to generate a content of the output object, wherein a number of operations for corrupting the first input is equal to a number of operations for de-noising the layout of the output object added with the content conditioner, and wherein, when an object corresponding to the first input and an object corresponding to the second input have a similarity greater than a threshold value, decreasing the number of operations for de-noising the layout of the output object added with the content conditioner.

13. The computer-readable medium of claim 12, wherein the generating of the layout of the output object includes:
applying a random noise to the first input; and
de-noising the first input applied with the random noise to generate the layout of the output object.

14. The computer-readable medium of claim 12, wherein the operations further comprise:
applying a weight to the content conditioner to adjust a number of elements corresponding to the second input to be added to the layout of the output object.

15. A generator for generating an object using a diffusion model, the generator comprising:
control logic configured to obtain a first input and a second input;
a machine learning model configured to synthesize an output object from the first input and the second input by:
generating a layout of the output object from the first input by corrupting the first input by adding Gaussian noise;
adding the second input as a content conditioner to the layout of the output object; and
de-noising the layout of the output object added with the content conditioner to generate a content of the output object, wherein a number of operations for corrupting the first input is equal to a number of operations for de-noising the layout of the output object added with the content conditioner, and wherein, when an object corresponding to the first input and an object corresponding to the second input have a similarity greater than a threshold value, decreasing the number of operations for de-noising the layout of the output object added with the content conditioner.

16. The generator of claim 15, further comprising:
an enhancer to apply a weight to the content conditioner to adjust a number of elements corresponding to the second input to be added to the layout of the output object.

17. The generator of claim 15, wherein the model is a pre-trained text-to-image diffusion-based generative model.

* * * * *